(12) United States Patent
Davies et al.

(10) Patent No.: US 7,680,760 B2
(45) Date of Patent: Mar. 16, 2010

(54) SYSTEM AND METHOD FOR LABELING A DOCUMENT

(75) Inventors: Winton Davies, San Francisco, CA (US); Deepa Joshi, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 529 days.

(21) Appl. No.: 11/261,981

(22) Filed: Oct. 28, 2005

(65) Prior Publication Data

US 2007/0100813 A1    May 3, 2007

(51) Int. Cl.
*G06F 17/30* (2006.01)
*G06F 17/00* (2006.01)

(52) U.S. Cl. .................. 707/1; 707/3; 715/254
(58) Field of Classification Search .......... 707/205, 707/2, 3, 4, 5, 6, 204; 715/254; 706/12
See application file for complete search history.

(56) References Cited

U.S. PATENT DOCUMENTS

| | | | | |
|---|---|---|---|---|
| 3,670,310 A | * | 6/1972 | Bharwani et al. | 707/3 |
| 6,377,983 B1 | * | 4/2002 | Cohen et al. | 709/217 |
| 2004/0034660 A1 | * | 2/2004 | Chen et al. | 707/104.1 |
| 2004/0064304 A1 | * | 4/2004 | Dehlinger et al. | 704/9 |
| 2004/0167845 A1 | * | 8/2004 | Corn et al. | 705/37 |
| 2005/0060643 A1 | * | 3/2005 | Glass et al. | 715/501.1 |
| 2005/0289199 A1 | * | 12/2005 | Aphinyanaphongs et al. | 707/205 |
| 2006/0020607 A1 | * | 1/2006 | Patterson | 707/100 |
| 2006/0041604 A1 | * | 2/2006 | Peh | 707/205 |
| 2006/0287988 A1 | * | 12/2006 | Mason | 707/3 |

* cited by examiner

*Primary Examiner*—Tony Mahmoudi
*Assistant Examiner*—Md. I Uddin
(74) *Attorney, Agent, or Firm*—Seth H. Ostrow; Ostrow Kaufman & Frankl LLP (57) ABSTRACT

A system and method for selecting a proxy keyword for an unknown document. An unknown document is received by a receiver. A plurality of candidate documents and corresponding keywords are determined for the unknown document. Using the keywords from the candidate documents, proxy keywords are determined for the unknown document based on a plurality of factors including a length of the keywords, a distance of the candidate documents from the unknown document, a similarity of the text between the unknown document and the respective candidate document, a rank of the keywords within each candidate document, and a frequency of the keyword within its respective candidate document.

21 Claims, 6 Drawing Sheets

Prior Art

Fig. 1

Also try: car rental, car insurance, used car, car audio  More...

- Cars at CarMax Search over 20,000 new and used cars, trucks, vans and SUVs in nearly every make transferable to the CarMax nearest you.
  www.carmax.com

- Free Car Price Quote Get a free car price quote on any new car. It takes less than 60 seconds for thi service.
  c.em871781.com

- Buy a New Car below Invoice Why pay sticker? You can buy a new car below invoice. Smart shopp our free service to find out how to save thousands on a new car. Get a price quote from a local dealer tod
  www.carsbelowinvoice.com Yahoo! Autos - Free Price Quotes - Classifieds - Blue Book
Yahoo! Shortcut - About 1. Cars.com
   features access to automotive classifieds and dealers, price info, news and reports, performance data, an and used cars.
   Category: Automotive > Buyers' Services
   www.cars.com - 39k - Cached - More from this site - Save - Block 2. Edmund's automobile buyer's guides
   Edmund's automobile buyer's guides Edmund's automobile buyer's guides Current prices of new and use and trucks, Chilton automotive repair manuals, Auto-By-Tel buying service, car insurance, recalls since 1! data, and ...
   Category: Automotive > Buyers' Services
   www.edmunds.com - More from this site - Save - Block 3. Kelley blue book: used car bluebook values and new car pricing.
   Kelley blue book: used car bluebook values and new car pricing. Kelley blue book: used car bluebook va car pricing. Free pricing reports for both new and used cars and trucks beginning with 1978. Used vehicle both ...
   Category: Automotive > Buyers' Services
   www.kbb.com - More from this site - Save - Block 4. Car Talk
   the official site of Click and Clack, the Tappet Brothers, A.K.A. Tom and Ray Magliozzi.
   Category: Automotive > Radio Programs
   www.cartalk.com - 40k - Cached - More from this site - Save - Block

SYSTEM AND METHOD FOR LABELING A DOCUMENT

BACKGROUND OF THE INVENTION

1. Field of the Invention

The invention relates to document labeling and, more particularly, to a system and method for assigning labels to an unknown document based on keywords used in labeling related documents.

2. Description of the Related Art

Figure 1:
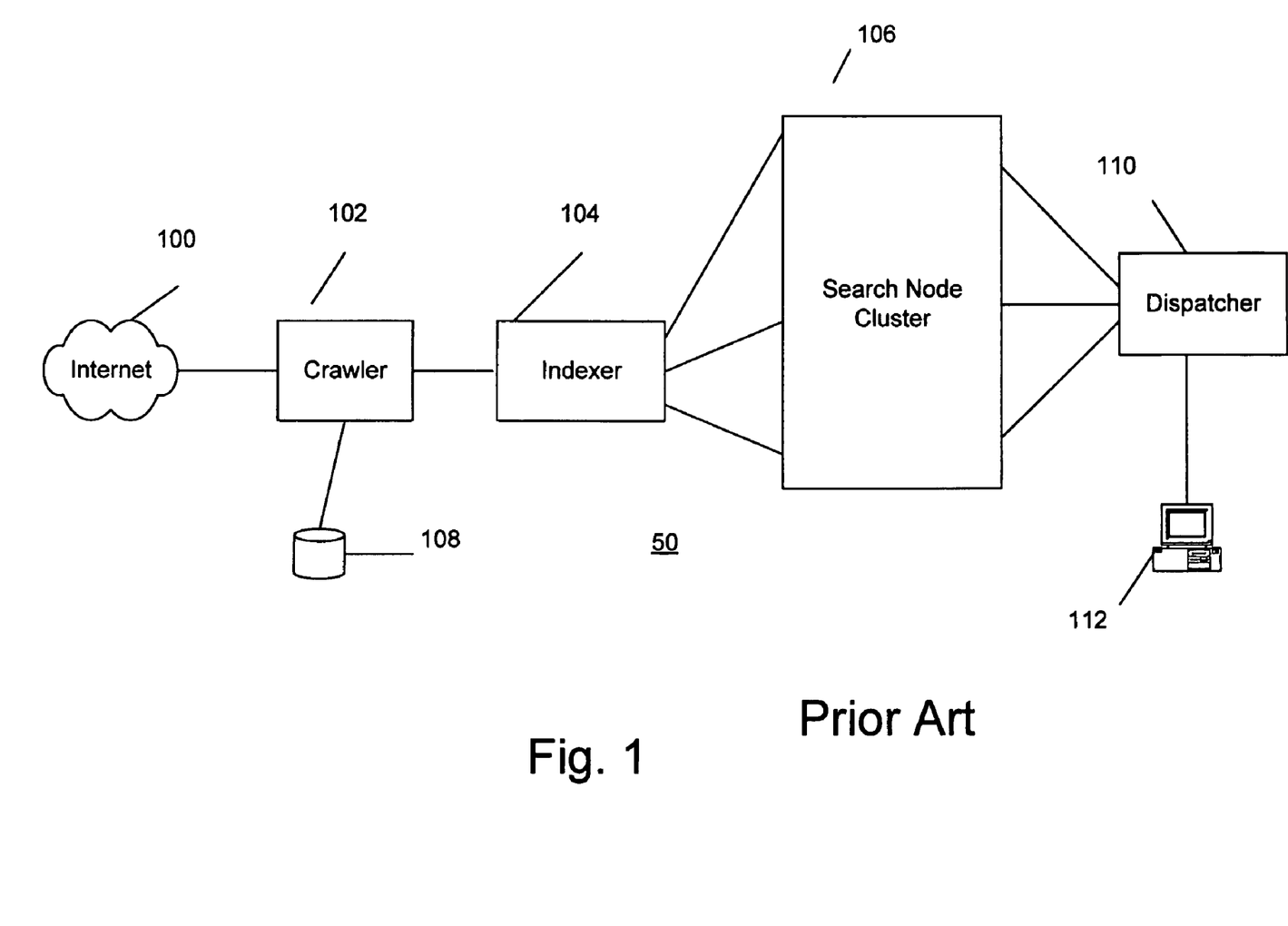
FIG. 1 is a block diagram illustrating a search engine architecture of the prior art.

The World Wide Web ("WWW") is a distributed database including literally billions of pages accessible through the Internet. Searching and indexing these pages to produce useful results in response to user queries is constantly a challenge. A device typically used to search the WWW is a search engine. A typical prior art search engine 50 is shown in FIG. 1. Pages from the Internet or other source 100 are accessed through the use of a crawler 102. Crawler 102 aggregates documents from source 100 to ensure that these documents are searchable. Many algorithms exists for crawlers and in most cases these crawlers follow links in known hypertext documents to obtain other documents. The pages retrieved by crawler 102 are stored in a database 108. Thereafter, these documents are indexed by an indexer 104. Indexer 104 builds a searchable index of the documents in database 108. Typical prior art methods for indexing include inverted files, vector spaces, suffix structures, and hybrids thereof. For example, each web page may be broken down into words and respective locations of each word on the page. The pages are then indexed by the words and their respective locations. A primary index of the whole database 108 is then broken down into a plurality of sub-indices and each sub-index is sent to a search node in a search node cluster 106.

In use, a user 112 sends a search query to a dispatcher 110. Dispatcher 110 compiles a list of search nodes in cluster 106 to execute the query and forwards the query to those selected search nodes. The search nodes in search node cluster 106 search respective parts of the primary index produced by indexer 104 and return sorted search results along with a document identifier and a score to dispatcher 110. Dispatcher 110 merges the received results to produce a final result set displayed to the user 112 sorted by relevance scores. The relevance score is a function of the query itself and the type of document produced. Factors that are used for relevance include: a static relevance score for the document such as link cardinality and page quality, superior parts of the document such as titles, metadata and document headers, authority of the document such as external references and the "level" of the references, and document statistics such as query term frequency in the document, global term frequency, and term distances within the document.

Figure 2:
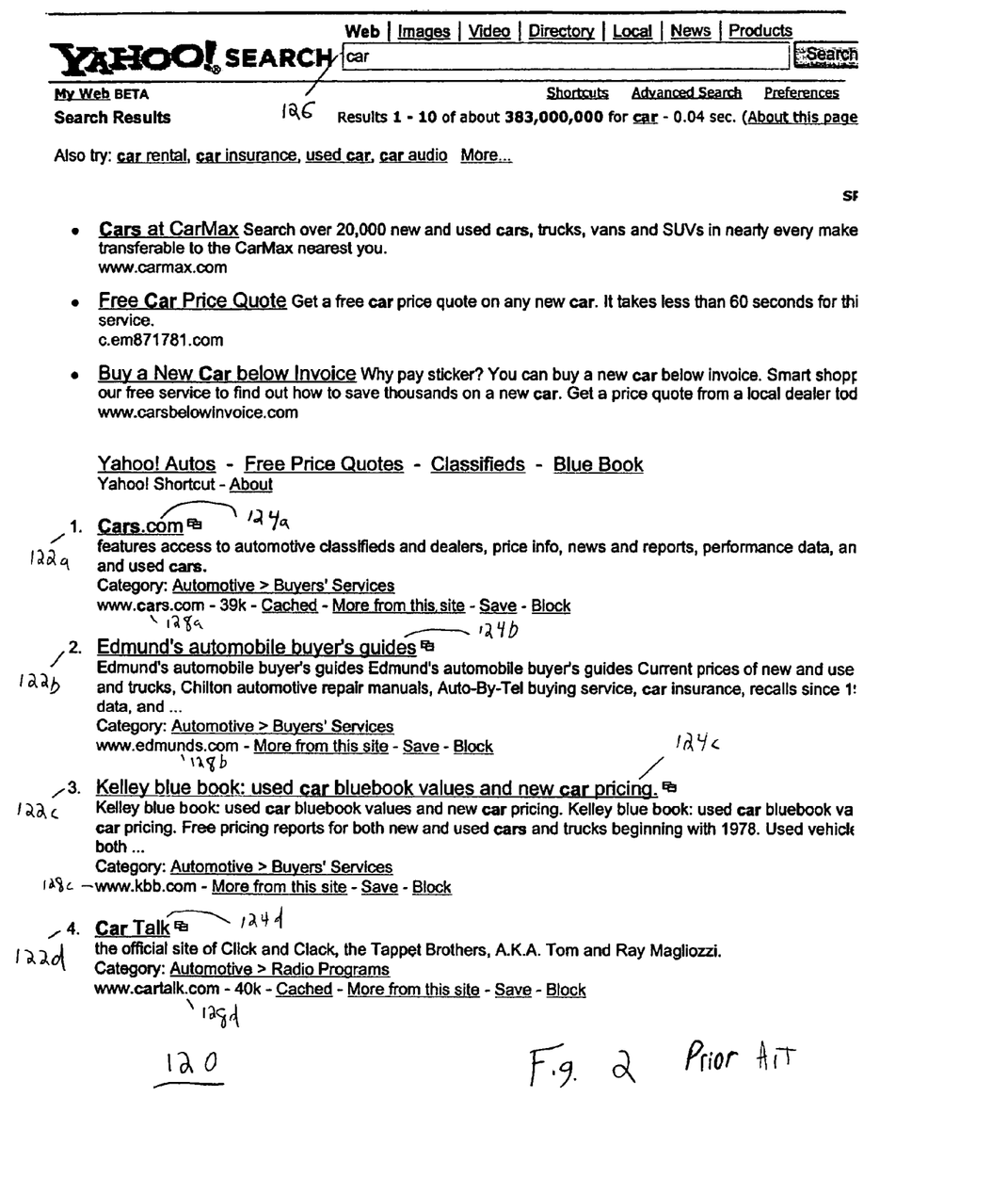
FIG. 2 is a screen shot illustrating a result set in response to a search query in accordance with the prior art.

Referring to FIG. 2, there is shown an example of a result set 120. As shown in the figure, in response to a query 126 for the term "car" shown on the top of the page, the search engine YAHOO! searched its index and produced a plurality of results in the form of result set 120 displayed to a user. For brevity, only a first page of result set 120 is shown. Result set 120 includes four results 122a, 122b, 122c, and 122d each with a respective hyperlink 124a, 124b, 124c and 124d and addresses or URLs 128a, 128b, 128c, 128d for documents that satisfy the user's query. Focusing on result 122a, result 122a includes hyperlink 124a including anchor text ("cars.com") describing the hyperlink and address 128a—where the user can find the respective document. Hyperlink 124a, when selected or clicked-on by the user, instructs the user's browser to request the document from the web site associated with address 128a. For example, if a user selects hyperlink 122b, the user's browser will request information from the web site at the address on the WWW "edmunds.com".

It is desirable to summarize the content of a document by, for example, labeling the document. These labels may be used to provide a user with alternative search query terms or may be used for mapping other types of data such as mapping a specific source document into a more general category. Prior art methods have so far been unable to effectively label a document in a timely manner.

Thus, there is a need in the art for a system and method which can timely determine labels for a web page.

SUMMARY OF THE INVENTION

One embodiment of the invention is a method for selecting a proxy keyword for a document. The method comprises receiving a first document, determining at least a first candidate document from the world wide web for the first document, and determining at least a first keyword for the first candidate document. The method further comprises determining at least a second candidate document from the world wide web for the first document, determining at least a second keyword for the second candidate document, and determining a proxy keyword for the first document based on the first and second keywords.

Another embodiment of the invention is a system for selecting a proxy keyword for a document. The system comprises a receiver effective to receive a first document, a candidate document determination module effective to determine at least a first candidate document from the World Wide Web for the first document, and a proxy phrase determination module effective to determine at least a first keyword for the first candidate document. The candidate document determination module is further effective to determine at least a second candidate document World Wide Web for the first document. The proxy phrase determination module is effective to determine at least a second keyword for the second candidate document. The system further comprises a processor effective to determine a proxy keyword for the first document based on the first and second keywords.

Still another embodiment of the invention is a document label file for a first document produced by the method of receiving a first document, determining at least a first candidate document from the world wide web for the first document, and determining at least a first keyword for the first candidate document. The method further comprises determining at least a second candidate document from the world wide web for the first document, determining at least a second keyword for the second candidate document, and determining a proxy keyword for the first document based on the first and second keywords.

DETAILED DESCRIPTION OF THE PREFERRED EMBODIMENT(S)

Figure 3:
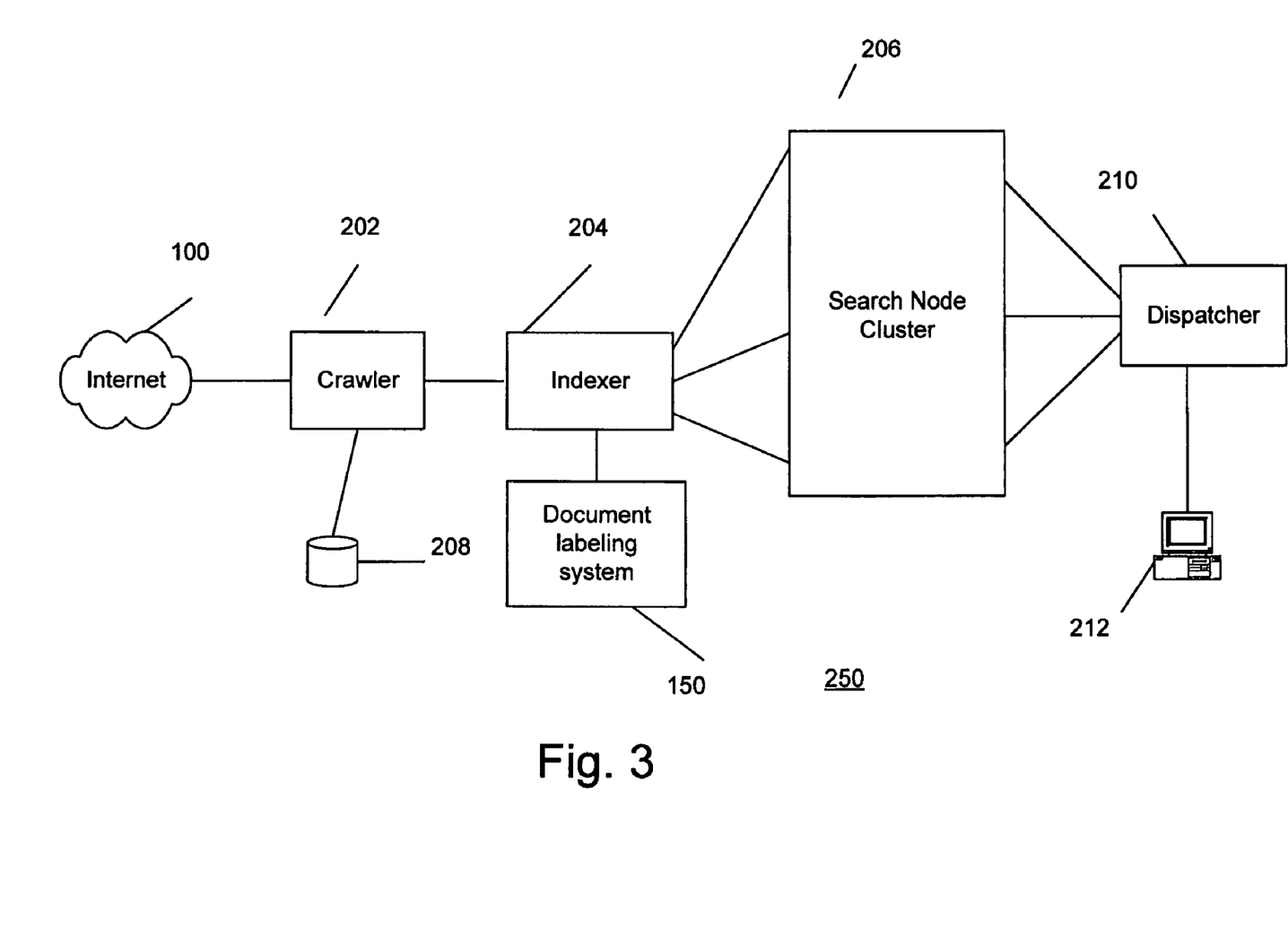
FIG. 3 is a system diagram illustrating a search engine in accordance with an embodiment of the invention.

Referring to FIG. 3, there is shown a search engine 250 in accordance with an embodiment of the invention. Pages from the Internet or other source 100 are accessed through the use of a crawler 202. Crawler 202 aggregates documents from source 100 to ensure that these documents are searchable. Many algorithms exists for crawlers and in most cases these crawlers follow links in known hypertext documents to obtain other documents. The pages retrieved by crawler 202 are stored in a database 208. Thereafter, these documents are indexed by an indexer 204. Indexer 204 builds a searchable index of the documents in database 208. Typical prior art methods for indexing include inverted files, vector spaces, suffix structures, and hybrids thereof. For example, each web page may be broken down into words and respective locations of each word on the page. The pages are then indexed by the words and their respective locations. A primary index of the whole database 208 is then broken down into a plurality of sub-indices and each sub-index is sent to a search node in a search node cluster 206. Search engine 250 further includes a document labeling system 150 used to label documents as described in more detail below.

Figure 4:
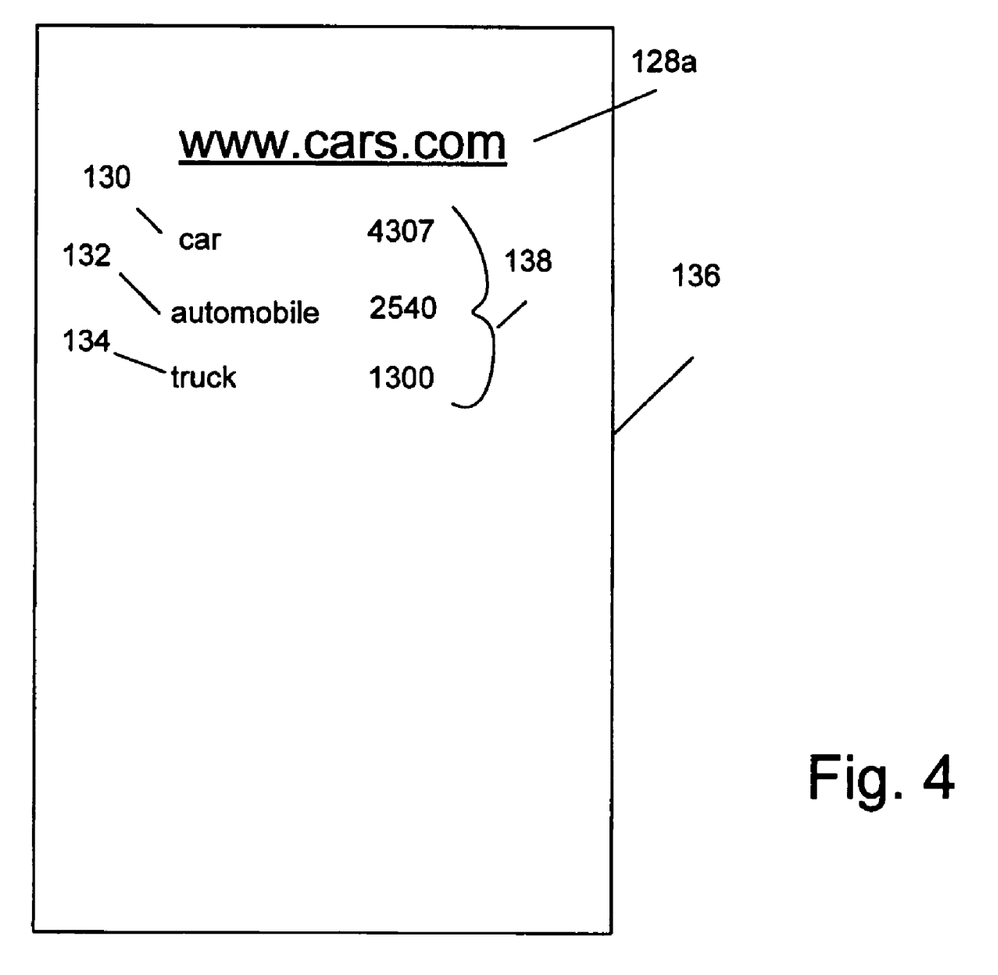
FIG. 4 is a diagram illustrating a document label file in accordance with an embodiment of the invention.

Referring also to FIG. 2, each time a user clicks on hyperlink 124, document labeling system 150 correlates the respective query 126 with a web page corresponding to the address 128 in hyperlink 124. For result 122a, the web page would correspond to address 128a on the WWW "cars.com". Referring now also to FIG. 4, a document label file 136 is created for the document existing at the URL "cars.com". Document label file 136 includes label 130 "car" and a number of times 138 users clicked through to the URL "cars.com" in response to a query for "car". When another query (e.g. "truck") is entered by a user and the user clicks through to the same address 128a (e.g. cars.com), document labeling system 150 updates document label file 136 to include the new query for address 128a as shown with labels 132 "automobile" and 134 "truck" and the corresponding number of times 138 these terms were clicked through.

Number 138 may be literally the number of times that users clicked through to the corresponding document based on an initial search term and number 138 may also be a function of the rank of the document in the initial result set and/or a function of the monthly volume of the respective term. The respective functions may be simply equal to the rank and/or monthly volume, or a log, or a linear adjustment—such as for the first ten results, the top result receives a value of "10" and the last result receives a value of "1". Other weighing schemes could be used.

The inventors have determined that labels 130, 132, 134 effectively describe the content of the corresponding document located at address 128a. However, the process above typically takes a long time to generate a sufficient number of labels for a web page for the labels to be useful. For example, each time a new web page is posted on the WWW, it could take a month before a useful list of labels is generated.

Figure 5:
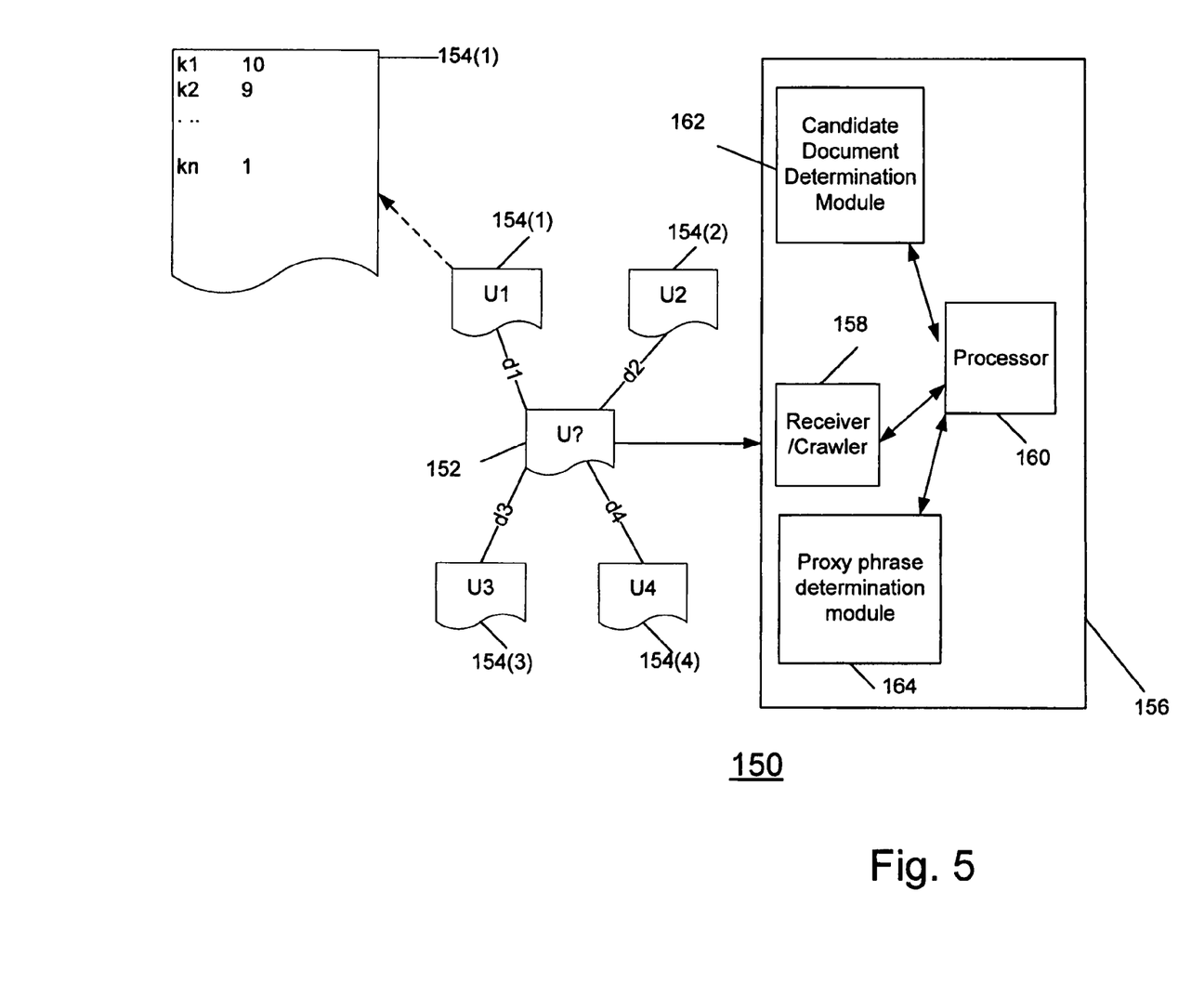
FIG. 5 is a system diagram illustrating a system for labeling a document in accordance with an embodiment of the invention.

Referring to FIG. 5, system 150 includes features for quickly generating labels for even unknown documents. As shown in the figure, an unknown document 152 with an unknown set of labels (as designated by "U?") is received by a receiver 158 in a document classification module 156. Receiver 158 could include an optional crawler which crawls the Internet looking for documents as is known in the art. In accordance with the invention, a processor 160 in classification module 156 controls a candidate document determination module 162 to determine candidate documents which are most similar to unknown document 152. Processor 160 then controls a proxy phrase determination module 164 to determine labels from these candidate documents as proxy labels for unknown document 152.

In FIG. 5, four candidate documents 154(1), 154(2), 154(3) and 154(4) are shown whose labels U1, U2, U3, U4 are possible candidates to be used as proxy labels in unknown document 152. Candidate documents 154(1), 154(2), 154(3) and 154(4) may be selected by, for example, using the following method. A search may be performed using a search engine on the top G valued search terms. G could be, for example 10,000, 100,000, or 1,000,000. A number P of URLs is retrieved for each one of these search terms. P could be, for example, 10, 100 or 1,000. A collection of all the unique URLs determined by this method forms the initial set of candidate documents and this initial set may be ranked using a TF/IDF (term frequency/inverse document frequency) algorithm or by using an inverted index. Thereafter, this initial set may be pruned down using, for example, a nearest neighbor algorithm (discussed below) to get, for example, 10 candidate documents. One could also use only the abstracts of each of these documents or the complete documents themselves.

As shown for candidate document 154(1), each candidate document 154 is labeled with keywords or phrases "k". The words "term", "label", "keyword" and "phrase" are used interchangeably throughout. Keywords could be, for example, movie names, star names, product codes, search phrases, bid-ed terms, etc. Each candidate document 154 may have, for example, n keywords which may ranked by the frequency in which each keyword k appears in its respective candidate document 154. In the embodiment shown in FIG. 5 there are thus 4 (for four candidate documents 154) X n possible proxy labels which may be used for unknown document 152. Of course, the invention is not limited to four candidate documents and any number, e.g. j, candidate documents may be used. If, for example, n=10 (e.g. there are 10 phrases for each candidate document) and j=100 (e.g. there are 100 candidate documents), there could be 1000 potential proxy phrases to use for unknown document 152. Processor 160 should be able to determine which of these phrases to use as a proxy label for unknown document 152.

One technique for choosing proxy phrases for unknown document 152 is to assign a value for each keyword k based on the rank of the keyword in its respective candidate document 154. For example, in candidate document 154(1), keyword k1 with a highest rank may get a value of 10, keyword k2 a value of 9 and keyword Kn may get a value of 1. One may then multiply the value of each keyword in each candidate document by a distance d between the respective candidate document 154(1) and unknown document 152. The phrases corresponding to the top n values may then be used as proxy phrases for unknown document 152.

The distance d between two documents may be determined using, for example, a nearest neighbor algorithm using the formula:

$$\frac{\sum [idf(ti)] \cdot [tf(x, ti)] \cdot [idf(ti)] \cdot [tf(y, ti)]}{\sqrt{\sum [idf(ti)] \cdot [tf(x, ti)] \cdot \sum [idf(ti)] \cdot tf(y, ti)]}}$$

where x and y are the documents being compared, ti is the set of terms in document x and y, idf is the inverse document frequency of a particular term t, and tf is the term frequency of term t. In FIG. 4, distances $d_1$, $d_2$, $d_3$ and $d_4$ are shown between unknown document 152 and respective candidate documents 154(1), 154(2), 154(3), 154(4). One could, for example, pick j=1 and n=1 (i.e. pick only the top keyword in the closest candidate document as the proxy keyword).

Clearly other techniques for choosing proxy labels are available. For example, instead of ranking each keyword k in each candidate document 154, one could sum up all the keywords k in each candidate document 154, assign each keyword k one (1) vote and then multiply the sum of the votes by the distance d between the respective candidate document 154 and unknown document 152. A support vector machine could also be used to ascertain applicable labels. Through experimentation, it has been determined that longer keywords generally have more information, and are more useful in labeling, higher frequency terms generally have less information, but keywords which occur more frequently in a document are preferred, and a comparison of the text between a candidate document and the unknown document proves to be highly relevant. As such, after finding a number N documents that are most similar to the unknown document based on text similarity, for each keyword k of M keywords in the N documents:

score($k$) in a candidate document=length($k$)×($N$-position(candidate document))×($M$-rank($k$,candidate document))×% of text match where:

N-position (URL)—reflects the idea that a document close to the unknown document is more relevant than the next closest document;

M-rank (k, URL)—reflects the idea that the best keyword for a known document is better than the next best keyword for a document; and % of text match—is between the candidate keyword and the unknown document and could be performed using the nearest neighbor algorithm referenced above.

Figure 6:
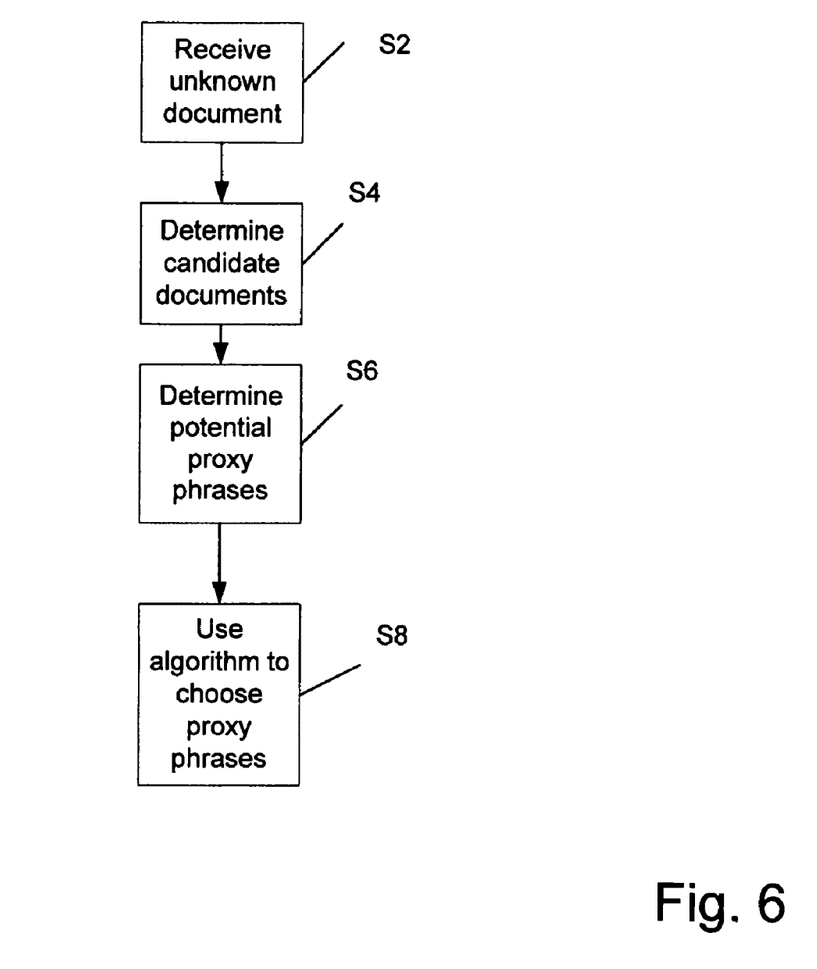
FIG. 6 is a flow chart illustrating a process for labeling a document in accordance with an embodiment of the invention.

Referring to FIG. 6, there is shown a flow chart describing a process in accordance with an embodiment of the invention. The process described in FIG. 6 could be used, for example, with system 150 described with reference to FIG. 5. At step S2, an unknown document is received. At step S4, candidate documents are identified for the unknown document. At step S6, potential proxy phrases for the unknown document are determined based on the candidate documents. At step S8, an algorithm is used to choose proxy phrases for the unknown document. The algorithm could be based on, for example, a length of the keywords in the candidate document, a ranking of the keywords, a similarity of the text between the candidate and unknown documents, a distance between the candidate and unknown documents, and a frequency of the potential proxy phrases in the respective candidate documents.

Thus, by determining candidate pages which are closest to an unknown page and scoring phrases in the candidate pages, a system for quickly assigning labels to an unknown page may be realized.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computerized method for selecting a proxy keyword for a document, the method comprising:

receiving an unknown document;

electronically determining, using a processing device, at least a first candidate document from the world wide web for the unknown document on the basis of a search of one or more valued search terms;

determining at least a first keyword for the first candidate document;

electronically determining, using the processing device, at least a second candidate document from the world wide web for the unknown document on the basis of a search of one or more valued search terms;

determining at least a second keyword for the second candidate document;

electronically determining, using the processing device, a proxy keyword for the unknown document based on the first and second keywords; and wherein the first candidate document and the second candidate document are documents which are most similar to the unknown document.

2. The method as recited in claim 1, wherein the determining a proxy keyword includes:

determining a first distance from the first candidate document to the unknown document;

determining a second distance from the second candidate document to the unknown document; and using the first and second distances to determine the proxy keyword.

3. The method as recited in claim 1, wherein the determining a proxy keyword includes:

determining a first length of the first keyword;

determining a second length of the second keyword; and using the first and second lengths to determine the proxy keyword.

4. The method as recited in claim 1, further comprising:

determining at least a third keyword for the first candidate document, the first and third keywords being in a first order;

determining at least a fourth keyword for the second candidate document, the second and fourth keywords being in a second order; and wherein the determining a proxy keyword for the unknown document is based on the first and second order.

5. The method as recited in claim 4, wherein:

the first order is based on a frequency in which the first and third keywords occur in the unknown document; and the second order is based on a frequency in which the second and fourth keywords occur in the second document.

6. The method as recited in claim 1, wherein the determining a proxy keyword for the unknown document is based on a percentage of text matching between the first keyword and the unknown document, and based on a percentage of text matching between the second keyword and the unknown document.

7. The method as recited in claim 6, wherein the determining a proxy keyword includes:

determining a first distance from the first candidate document to the unknown document;

determining a second distance from the second candidate document to the unknown document; and using the first and second distances to determine the proxy keyword.

8. The method as recited in claim 7, wherein the determining a proxy keyword includes:

determining a first length of the first keyword;

determining a second length of the second keyword; and using the first and second lengths to determine the proxy keyword.

9. The method as recited in claim 8, further comprising:
    determining at least a third keyword for the first candidate document, the first and third keywords being in a first order;
    determining at least a fourth keyword for the second candidate document, the second and fourth keywords being in a second order; and wherein
    the determining a proxy keyword for the unknown document is based on the first and second order.

10. The method as recited in claim 1, wherein the receiving the unknown document including crawling the World Wide Web.

11. The method as recited in claim 1, wherein the determining at least a first keyword includes:
    determining a rank of the first candidate document in response to a search for a particular search query; or
    determining a monthly volume of the first keyword.

12. A system for selecting a proxy keyword for a document, the system comprising:
    a receiver effective to receive an unknown document;
    a candidate document determination module effective to determine at least a first candidate document from the World Wide Web for the unknown document on the basis of a search of one or more valued search terms;
    a proxy phrase determination module effective to determine at least a first keyword for the first candidate document;
    the candidate document determination module further effective to determine at least a second candidate document from the World Wide Web for the unknown document on the basis of a search of one or more valued search terms;
    the proxy phrase determination module effective to determine at least a second keyword for the second candidate document; and
    a processor effective to determine a proxy keyword for the unknown document based on the first and second keywords; and
    wherein the first candidate document and the second candidate document are documents which are most similar to the unknown document.

13. The system as recited in claim 12, wherein the processor is effective to determine the proxy keyword by:
    determining a first distance from the first candidate document to the unknown document;
    determining a second distance from the second candidate document to the unknown document; and
    using the first and second distances to determine the proxy keyword.

14. The system as recited in claim 12, wherein the processor is effective to determine the proxy keyword by:
    determining a first length of the first keyword;
    determining a second length of the second keyword; and
    using the first and second lengths to determine the proxy keyword.

15. The system as recited in claim 12, wherein:
    the proxy phrase determination module is further effective to determine at least a third keyword for the first candidate document, the first and third keywords being in a first order;
    the proxy phrase determination module is further effective to determine at least a fourth keyword for the second candidate document, the second and fourth keywords being in a second order; and wherein
    the processor is effective to determine the proxy keyword for the unknown document based on the first and second order.

16. The system as recited in claim 15, wherein:
    the first order is based on a frequency in which the first and third keywords occur in the unknown document; and
    the second order is based on a frequency in which the second and fourth keywords occur in the second document.

17. The system as recited in claim 12, wherein the processor is effective to determine the proxy keyword for the unknown document based on a percentage of text matching between the first candidate document and the unknown document, and based on a percentage of text matching between the second candidate document and the unknown document.

18. The system as recited in claim 17, wherein the processor determines the proxy keyword by:
    determining a first distance from the first candidate document to the unknown document;
    determining a second distance from the second candidate document to the unknown document; and
    using the first and second distances to determine the proxy keyword.

19. The system as recited in claim 18, wherein the processor determines the proxy keyword by:
    determining a first length of the first keyword;
    determining a second length of the second keyword; and
    using the first and second lengths to determine the proxy keyword.

20. The system as recited in claim 19, wherein:
    the proxy phrase determination module is further effective to determine at least a third keyword for the first candidate document, the first and third keywords being in a first order;
    the proxy phrase determination module is further effective to determine at least a fourth keyword for the second candidate document, the second and fourth keywords being in a second order; and wherein
    the processor is effective to determine the proxy keyword for the unknown document based on the first and second order.

21. The system as recited in claim 12, wherein the receiver includes a crawler.

* * * * *